(12) United States Patent
Bertini

(10) Patent No.: US 7,353,601 B1
(45) Date of Patent: Apr. 8, 2008

(54) INTEGRATED METHOD FOR RESTORING ELECTRICAL POWER CABLE

(75) Inventor: Glen J. Bertini, Tacoma, WA (US)

(73) Assignee: Novinium, Inc., Kent, WA (US)

( * ) Notice: Subject to any disclaimer, the term of this patent is extended or adjusted under 35 U.S.C. 154(b) by 228 days.

(21) Appl. No.: 11/379,979

(22) Filed: Apr. 24, 2006

Related U.S. Application Data

(60) Provisional application No. 60/712,644, filed on Aug. 30, 2005.

(51) Int. Cl.
*H01R 43/00* (2006.01)

(52) U.S. Cl. .............................. 29/858; 29/857; 29/859

(58) Field of Classification Search ........... 29/854–859
See application file for complete search history.

(56) References Cited

U.S. PATENT DOCUMENTS

| | | | |
|---|---|---|---|
| 3,800,017 | A | 3/1974 | Williams et al. |
| 3,956,420 | A | 5/1976 | Kato et al. |
| 4,144,202 | A | 3/1979 | Ashcraft et al. |
| 4,212,756 | A | 7/1980 | Ashcraft et al. |
| 4,299,713 | A | 11/1981 | Maringer et al. |
| 4,332,957 | A | 6/1982 | Braus et al. |
| 4,372,988 | A | 2/1983 | Bahder |
| 4,400,429 | A | 8/1983 | Barlow et al. |
| 4,545,133 | A | 10/1985 | Fryszczyn et al. |
| 4,608,306 | A | 8/1986 | Vincent |
| 4,766,011 | A | 8/1988 | Vincent et al. |
| 4,840,983 | A | 6/1989 | Vincent |
| 4,870,121 | A | 9/1989 | Bamji et al. |
| 5,279,147 | A | 1/1994 | Bertini et al. |
| 5,372,840 | A | 12/1994 | Kleyer et al. |
| 5,372,841 | A | 12/1994 | Bertini et al. |
| 5,907,128 | A | 5/1999 | Lanan et al. |
| 6,005,055 | A | 12/1999 | Dammert et al. |
| 6,162,491 | A | 12/2000 | Bertini |

(Continued)

FOREIGN PATENT DOCUMENTS

GB 2270792 A * 3/1994

OTHER PUBLICATIONS

Robert E. Treybal, Mass-Transfer Operations, Chapter 4 "Diffusion in Solids" pp. 88-103, McGraw-Hill Book Company, 1980.

(Continued)

*Primary Examiner*—C. J Arbes
(74) *Attorney, Agent, or Firm*—Davis Wright Tremaine LLP; George C. Rondeau, Jr.

(57) ABSTRACT

A method for extending the useful life of an in-service electrical cable section having at least two existing connectors attached thereto and a conductor surrounded by a conductor shield encased in a polymeric insulation jacket with an interstitial void volume in the region of the conductor. The method includes replacing each connector with a corresponding high-pressure connector, and injecting a dielectric enhancement fluid into the void volume and confining the fluid therein at a pressure sufficient to introduce at least about 0.75Q of the fluid. Wherein Q represents the weight of the fluid which would saturate the conductor shield and insulation jacket, and the void volume at atmospheric pressure being less than that which would accommodate the amount 0.75Q. The method is carried out using only a single switching cycle.

36 Claims, 6 Drawing Sheets

U.S. PATENT DOCUMENTS

| | | |
|---|---|---|
| 6,697,712 B1 | 2/2004 | Bertini et al. |
| 2002/0046865 A1 | 4/2002 | Bertini et al. |
| 2005/0189130 A1 | 9/2005 | Bertini et al. |
| 2005/0191910 A1 | 9/2005 | Bertini |
| 2005/0192708 A1 | 9/2005 | Bertini |

OTHER PUBLICATIONS

Glen J. Bertini, UTILX Corp.; Recent Advancements in Cable Rejuvenation Technology; IEEE/PES 1999 Summer Meeting; Reliability Centered Maintenance; Jul. 21, 1999; 5 pgs.

C. Katz, B. Fryszcyn, M. Walker, B.S. Berstein; Extending The Service Like of Ethylene Propylene Rubber Insulated Cables; IEEE Paper presented at ICC mtg; 1999-2000; 6 pgs.

Kim Jenkins, UTILX Corp.; Submarine Cable Rescued With Silicone-Based Fluid; Slide Presentation; USA; 18 pgs.

Premedia Business Magazines & Media Inc.; Submarine Cable Rescued With Silicone-Based Fluid; Transmission & Distribution World; Jul. 1, 1999; 4 pgs; USA.

Glen J. Bertini, IEEE, UTILX Corp.; Enhancing the Reliability of Solid-Dielectric Cables; 4 pgs.; Kent, Washington; USA.

R. Hudson & M. Crucitt; Salt River Project; SRP Enhance Reliability of Underground Distribution Cable; 4 pgs., http://www.tdworld.com/mag/power_srp_enhances_reliability/.

IEEE Power Engineering Society; Insulated Conductors Committee Meeting, Minutes of the 104th Meeting; Oct. 25-26, 1998; 4 pgs.; GB600565-GB600568; St. Petersburg, FLA; USA.

EPRI Secondary Cable Workshop; Extending The Life of Secondary Cables; May 6, 1998; 1 page; Charlotte, NC; USA.

East Grand Forks Case Study; 1997; 1 page; USA.

IEEE Power Engineering Society; The Importance of Diffusion and Water Scavenging in Dielectric Enhancement . . . ; Technical Paper Summaries; 7 pages.

Glen J. Bertini, Entergy Metro Case Study; Post-Treatment Lessons; ICC Meeting; Apr. 1997; Scottsdale, Arizona; USA.

Glen J. Bertini, Dow Corning Corp., Cliff Richardson, Hendrix Wire & Cable; Silicone Strand-Fill: A New Material and Process; Spring 1990 IEEE/PES ICC; 11 pgs.; Dearborn, MI.

A.L. Mckean; Breakdown Mechanism Studies in Crosslinked Polyethylene Cable; IEEE Transactions on Power Apparatus and Systems, vol. PAS-95, No. 1; Jan./Feb. 1976; Yonkers, NY; USA.

\* cited by examiner

INTEGRATED METHOD FOR RESTORING ELECTRICAL POWER CABLE

CROSS REFERENCE TO RELATED APPLICATION

This application claims priority benefit of provisional application Ser. No. 60/712,644 filed Aug. 30, 2005.

FIELD OF THE INVENTION

The present invention relates to a method for extending the longevity of an electrical power cable. More particularly, the invention relates to an improved method for restoring the dielectric properties of an in-service electrical cable segment wherein a dielectric enhancing fluid is injected into the interstitial void volume of the cable.

BACKGROUND OF THE INVENTION

Extensive networks of underground electrical cables are in place in many parts of the industrialized world. Such underground distribution offers great advantage over conventional overhead lines in that it is not subject to wind, ice or lightning damage and is thus viewed as a reliable means for delivering electrical power without obstructing the surrounding landscape, the latter feature being particularly appreciated in suburban and urban settings. Unfortunately, these cables (which generally comprise a stranded (or solid) conductor surrounded by a semi-conducting conductor shield, a polymeric insulation jacket, and an insulation shield), particularly those installed prior to 1985, often suffer premature breakdown and do not attain their originally anticipated longevity of 30 to 40 years. Their dielectric breakdown is generally attributed to so-called "treeing" phenomena (i.e., formation of microscopic voids or branching channels within the insulation material, from which the descriptive terminology derives), which lead to a progressive degradation of the cable's insulation. Since replacing a failed section of underground cable can be a very expensive and involved procedure, there is a strong motivation on the part of the electrical utility industry to extend the useful life of existing underground cables in a cost-effective manner.

A typical method for rejuvenating in-service cables comprises introducing a tree retardant fluid into the void space (interstitial void volume) associated with the strand conductor geometry. This fluid, which diffuses into the insulation and fills the microscopic trees to augment the service life of the cable, is generally selected from a particular class of aromatic alkoxysilanes, which can polymerize within the cable's interstitial void volume, as well as within the water tree voids in the insulation (Vincent et al. in U.S. Pat. No. 4,766,011). This method and variations thereof employing certain rapidly diffusing components (U.S. Pat. Nos. 5,372,840 and 5,372,841) have enjoyed commercial success over the last decade or so, but they still have some practical limitations when reclaiming underground residential distribution (URD) cables. The latter have a relatively small diameter (typically smaller than 4/0 and a conductor area of <107.2 $mm^2$) and therefore present insufficient interstitial volume relative to the amount of retardant fluid required for optimum dielectric performance (e.g., sufficient retardant to saturate the conductor shield and insulation of the cable segment). This problem, however, is not limited to cables having such relatively small conductors since other geometric factors, such as strand compression and the greater insulation thickness associated with higher voltage cables, can also lead to insufficient interstitial volume in larger cables. Additionally, the specific properties of the treatment fluids (particularly solubility and diffusion) have an equally important influence. Thus, for all practical purposes, only a very small percentage of medium voltage or transmission voltage solid dielectric cables installed around the world do not suffer from the above mentioned inadequate interstitial volume relative to the amount of fluid required.

Therefore, although not explicitly required by the above mentioned disclosures, an in-the-field reclamation of URD cables employing the silane-based tree retardants typically leaves a fluid reservoir connected to the cable for a 60 to 90 day "soak period" to allow the tree retardant fluid to penetrate (i.e., diffuse into) the cable insulation and thereby restore the dielectric properties. As a result, it is generally necessary to have a crew visit the site at least three times: first, to begin the injection, which often involves a receiving bottle with an applied vacuum at one end and a slightly pressurized feed reservoir at the other end of the cable; second, to remove the receiving bottle a few days later after the fluid has traversed the length of the cable; and, finally, to remove the reservoir after the soak period is complete.

In detail, the current practice for restoring cables smaller than 4/0 or 107.2 $mm^2$ having a stranded conductor comprises the following steps for a typical cable segment in a loop configuration:

(a) To avoid interruption of electrical power to utility customers, it is generally necessary to close the normally-open point in the circuit or loop. This step requires extensive coordination with the facility owner for safety considerations and requires repeated locking and unlocking of safety enclosures.

(b) Access the cable ends at an enclosure (typically a transformer or switch and sometimes a pole-mounted switch) and, using methods well know in the art, switch, de-energize, test for a de-energized condition with a voltmeter and ground the subject cable segment.

(c) Remove dead-front terminations and test the segment with a time domain reflectometer (TDR) to identify approximate locations of neutral corrosion and splices. If no significant corrosion is found, proceed to the next step;

if there is corrosion, abandon segment, either temporarily or permanently. See step (m).

(d) Install injection terminations of the types disclosed in, e.g., U.S. Pat. Nos. 4,946,393, 5,082,449 or 6,332,785 or live-front injection adaptors well know in the art.

(e) Perform a gas flow test to identify any blockage or leak in splices using methods well known in the art. An electronic version of those well know methods is described in, e.g., U.S. Pat. No. 5,279,147. If not found, proceed to the next step; if there is blockage or leaking, abandon segment either temporarily or permanently. See step (m).

(f) Use a vacuum to evacuate most of the air from the cable. A vacuum is critical to this prior art approach since it typically represents about one-third of the available driving force of the injection. Further, not using vacuum results in residual bubbles in splices or other discontinuities along the flow path. Bubbles, of course, lead to regions of under-treatment, a huge issue when one considers that this low pressure approach typically under treats URD cables even under the best of circumstances.

(g) Inject desiccant (e.g., an anhydrous alcohol such as isopropyl alcohol or a mixture of anhydrous alcohols and alkoxy-functional silanes) into the interstitial void volume. This is believed to help flush excess water out of the cable strands, leaving the methoxy functionality of the primary treatment fluid to react with water in the cable's strand-shield and insulation system. The desiccation step improves safety of the subsequent injection while the cable is energized, as conventionally practiced, since the trapped water typically contains ionic contaminants and is a particularly good conductor. Additionally, even low pressure gas is a decent conductor (i.e., Paschen's Law) and displacement of air or nitrogen with organic and silane vapors also increases safety since the latter compounds have superior dielectric properties compared to the gases. Finally, the desiccant mitigates premature reaction of water with the treatment fluid, which would increase the bulk viscosity of the latter and impair efficient flow through the interstices.

(h) Inject tree retardant fluid using a pressure of less than 30 psig (pounds per square inch gage), leaving the cable unattended until the interstitial void volume is filled (several hours, and more typically, several days). In some cases, higher pressures may be employed, in which case the fluid will generally traverse the length of the segment and flush the strands while the injection crew is standing by. In this case, temporary rubber hoses and clamps facilitate injection but these are replaced with permanent low pressure terminations for the soak phase.

(i) Re-energize the cable segment (it is also possible to re-energize after step (d) and up to this point, but all following steps through (l) are carried out on energized equipment). Once this cable segment is re-energized, another cable segment in the loop may be switched out and treated by independently following steps (b) through (l), or the loop can be returned to its normal operational mode by opening the normally-open point.

(j) Reopen the transformer enclosure at the vacuum end of the cable segment to confirm sufficient fluid flush into the vacuum tank. If the vacuum is diminished, refresh the vacuum. Repeat this step until sufficient fluid flush has accumulated.

(k) Open the transformer enclosure at the feed end of the cable segment and confirm there is sufficient fluid for the soak phase. Generally this is only performed once, but for longer runs it may be necessary to repeat this step several times until the end of the designated soak period or until sufficient fluid has been introduced.

(l) Reopen the transformer enclosure at the feed end of the cable segment when the soak period is complete and remove the feed tank. Close and lock the enclosure.

In addition, the following steps are required when a decision is made to address blocked or leaking splices and corroded neutrals, as mentioned in steps (c) and (e) above:

(m) Perform a cost-benefit analysis described by the "Repair Viability" graph and the associated text in the paper "Advancements in Cable Rejuvenation Technology" presented by Glen J. Bertini at IEEE/PES 1999 Summer Meeting, Reliability Centered Maintenance (Jul. 21, 1999) to determine if the incremental benefit of repair is greater than the incremental cost to repair. If the cost is greater than the benefit, abandon the effort; otherwise proceed to the next step.

(n) Schedule a digging crew/digging equipment to visit the site at the same time as the injection crew, previously having notified the governmental "No-dig" authority. The digging crew equipment may include some or all of the following: (1) shovels, (2) backhoes/excavators, or (3) vacuum excavators.

(o) Close the normally-open point in the circuit or loop.

(p) Access the cable ends at an enclosure and de-energize, test for a de-energized condition with a voltmeter, and ground the subject cable segment.

(q) Remove dead-front terminations and test the segment with a TDR to identify precise distances of neutral corrosion and splices from the cable ends.

(r) Attach an RF transmitter (e.g., Radio Detection RD 4000) to impress a radio tone on the cable and determine the precise location of the splice(s) and/or corrosion location(s).

(s) Dig the pit(s).

(t) Replace the blocked or leaking splices and/or repair the corrosion.

(u) Replace the excavated soils and repair any damage to landscaping or pavement.

(v) Return to step (d), above, and repeat the subsequent injection steps though step (l).

Those skilled in the art will readily appreciate that it is not practical to de-energize a given cable segment each time it is visited since the switching process is time consuming (and thus expensive) and, when circuits are not in a loop configuration, the electrical end-user cannot be bothered with repeated outages. Thus, even though the circuit owner may desire to treat essentially all segments, the current practice is to leave a large percentage (typically 10 to 40%) untreated. To meet the circuit owner's reliability requirements, these untreated cables are typically replaced at a cost two to three times higher than that of restoration. Ironically, these cables are even more expensive to deal with than if they had been simply replaced to begin with because they were visited by an injection crew first and the labor expense is ultimately absorbed by the circuit owner. Moreover, the repetitive trips to an injection site are not only costly in terms of human resource, but each exposure of workers to energized equipment presents additional risk of serious injury or fatality and it is clearly beneficial to minimize such interactions. Thus, in view of the above limitations, a circuit owner might find it economically equivalent, or even advantageous, to completely replace a cable once it has deteriorated rather than resort to the above restorative methods.

In all of the above-recited methods for treating in-service cables, the tree retardant fluid is injected into the stranded conductor cable under a relatively low pressure sufficient to facilitate filling the interstitial void volume (typically less than about 30 psig). And, although considerably higher pressures have been employed to this end, the pressure was discontinued after the cable was filled.

SUMMARY OF THE INVENTION

It has now been discovered that an improved overall efficiency can be enjoyed in treating the above-described stranded-conductor cables having inadequate interstitial volume relative to the amount of dielectric enhancement fluid required, particularly URD cables. This improved efficiency is realized when the existing splices and terminations of at least one in-service cable section (i.e., a cable segment or sub-segment) are replaced with corresponding high-pressure connectors of the type described below and the cable section is injected with a dielectric enhancement fluid which is confined within the interstitial void volume at an elevated pressure. Site-available vacuum excavation equipment facilitates the expeditious replacement of the connectors. With the instant integrated method, it is now possible to assess, and completely treat, such an in-service cable section using only a single switching cycle, preferably in a single visit to the site of the cable section.

The instant method, therefore, relates to an integrated method for extending the useful life of at least one in-service electrical cable section having at least two existing connectors attached thereto, said cable section having a conductor surrounded by a conductor shield encased in a polymeric insulation jacket and having an interstitial void volume in the region of the conductor, said integrated method comprising the steps:

(a) replacing each said existing connector with a corresponding high-pressure connector; and (b) injecting a dielectric enhancement fluid into the interstitial void volume of said cable section and confining said fluid therein at a pressure sufficient to introduce at least about 0.75 Q of said fluid, wherein Q represents the weight of said fluid which would saturate said conductor shield and said insulation jacket, the interstitial void volume of said cable section at atmospheric pressure being less than that which would accommodate said amount 0.75 Q, and wherein said integrated method is carried out using only a single switching cycle.

DETAILED DESCRIPTION OF THE INVENTION

Figure 1:
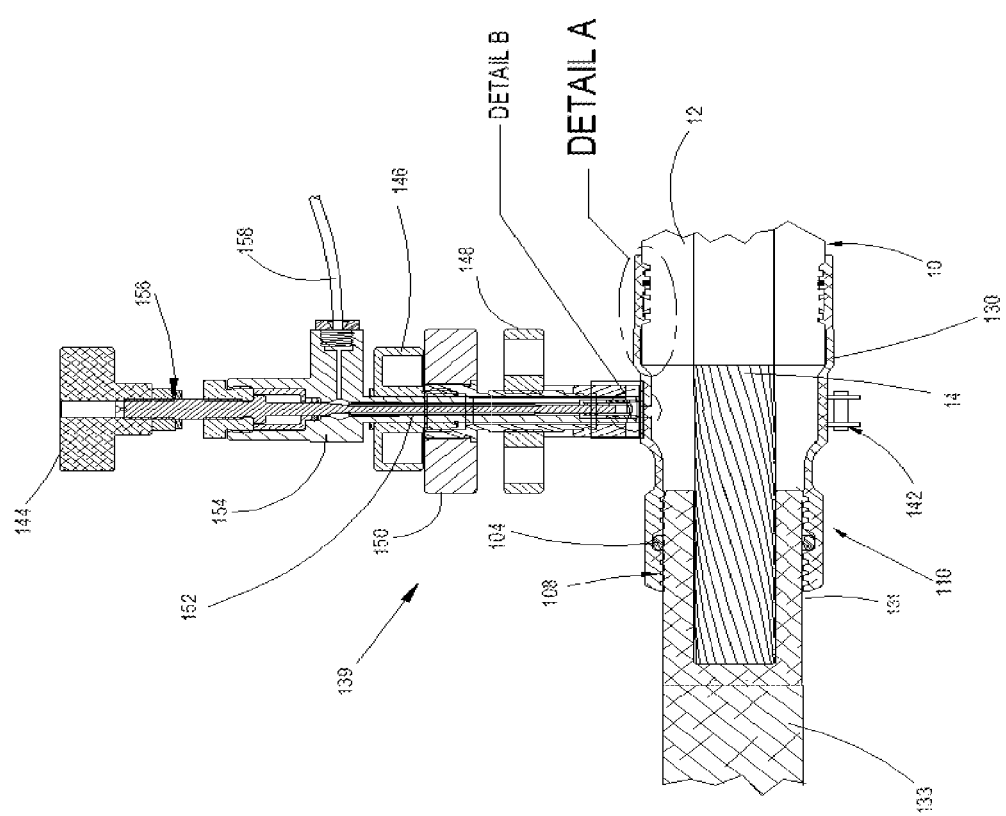
FIG. 1 shows a partial cross-sectional view of an injection tool clamped in position over a swagable high-pressure terminal connector having a trapezoidal recessed groove.

For the purposes herein, the in-service electrical cable according to the present integrated method is generally of the type used in underground residential distribution and typically comprises a central core of a stranded copper or aluminum conductor encased in polymeric insulation jacket. As is well known in the art, there is usually also a semi-conducting or high permittivity polymeric conductor shield positioned between the conductor and the insulation jacket. Further, there is often a semi-conducting insulation shield covering the insulation, the latter being ordinarily wrapped with a wire or metal foil grounding strip and, optionally, encased in an outer polymeric protective jacket. The above-mentioned interstitial volume is the void space within the conductor shield, and is defined by the strand geometry. The insulation is preferably a polyolefin polymer, such as polyethylene or a copolymer of ethylene and propylene or vinyl acetate or is a solid-fluid dielectric such as paper-oil. Medium voltage (5-35 kV), low voltage (<5 kV) and high voltage (>35 kV) cables are contemplated herein.

As used herein, the term "in-service" refers to a cable which has been under electrical load and exposed to the elements, usually for an extended period (e.g., 10 to 40 years). In such a cable, the electrical integrity of the cable insulation has generally deteriorated to some extent due to the formation of water or electrical trees, as described above. Further, the term "cable segment" as used herein refers to the length of cable between two terminal connectors, while a "cable sub-segment" is defined as a physical length of uninterrupted (i.e., uncut) cable extending between the two ends thereof. Thus, a sub-segment can exist between a terminal connector and a splice connector or between two splice connectors, and a cable segment can comprise one or more sub-segments. It should also be apparent that a cable segment is identical with a sub-segment when no splices are present between two terminal connectors. For the sake of efficiency, the term "cable section" will be used herein to designate either a cable segment or a cable sub-segment, and the more specific terms will be applied where appropriate.

In its most basic form, the instant integrated method is a method of treating, or extending the useful life of, at least one in-service cable section which integrates two elements: (1) single switch splice clearing and (2) single shot injection. Together, these elements allow complete treatment of at least one cable section using only a single switching cycle, preferably in a single visit to the site of the cable. As used herein, a "single switching cycle" is the de-energizing and first re-energizing after completing the injecting step, which step comprises beginning the injection and completing injection of the dielectric enhancement fluid according to the instant integrated method. Once the cable section is de-energized to perform the integrated method, a single switching cycle would normally not include, or require, any interim re-energizing and de-energizing steps prior to completing the injection step. However, should such superfluous switching steps be intentionally performed, their introduction would still be encompassed by the definition of a single switching cycle as used herein (i.e., the first re-energizing occurs after the completed injection step whereby the dielectric enhancement fluid is contained in the cable segment at a residual elevated pressure). As used herein, a "single visit" denotes completion of the instant integrated method (i.e., replacing existing connectors and injecting dielectric enhancement fluid) for a given in-service cable section within a normal workday or work shift, and does not require a work crew to return to the cable site another day/work shift. Typically, this total integrated method can be completed in a matter of a few hours. In normal application of the present integrated method, there will be a plurality of cable sections to be treated at a given job site since cables are generally treated in preemptive (cable is likely to soon fail based on previous experience), proactive (prophylactic treatment to extend life), as well as reactive (cable already failed) modes.

Single switch splice clearing is defined herein as the removal of all existing conventional splice connectors and terminal connectors associated with a cable section and replacement thereof with respective high-pressure injection splice connectors and terminal connectors while the cable section is switched out (i.e., de-energized and grounded). These high-pressure connectors are described further below as well as in United States Patent Application Publication No. 2005/019190 A1, hereby incorporated by reference. During this procedure, neutral corrosion can also be repaired. In a typical procedure, the existing connector is cut with conventional cable cutters at a central position, the associated component insulation and shields are stripped off, and the old strand connector is cut off. Preferably, vacuum excavation equipment is employed to dig the pits, thereby exposing existing splices. It is further preferred that very high-pressure supersonic air cutting or water jet cutting is also available to enhance the capability of the injection team carrying out the splice clearing operation. For optimal efficiency, the vacuum excavation operators should be integral with the injection team, performing other tasks when the vacuum equipment is not in use. In any case, the vacuum excavation equipment, or other means for digging pits quickly, should be standing by at all times. It is, of course, possible to share vacuum excavation equipment and personnel, but only if the teams sharing them are in proximity of one another.

Single shot injection, as used herein, indicates that the interstitial void volume of the cable section is injected with at least about 75 weight % of the amount (Q) of dielectric enhancement fluid, the latter quantity being further defined below. The injection step is carried out during the above mentioned single switching cycle, thereby eliminating the need to leave a fluid reservoir attached to the cable, as practiced by the prior art methods. In order to accomplish this with the above described cables having insufficient interstitial volume, the dielectric enhancement fluid is injected at elevated (high) pressures and confined in the interstitial void volume of the cable section at a similar elevated, residual pressure, as described in detail in United States Patent Application Publication Nos. 2005/0192708 A1 and 2005/0189130 A1, both of which are hereby incorporated by reference. As used herein, "high pressure" is defined as a pressure above about 50 psig, but less than that corresponding to the elastic limit of the cable's insulation. In order to facilitate rapid injection, the pressure is as high as possible consistent with the elastic limit constraint. For example, the pressure can be between about 100 and about 1000 psig, between about 100 and about 600 psig, between about 300 psig and about 1000 psig, or between about 300 psig and about 600 psig. As used herein, the term "elastic limit" of the insulation jacket of a cable section is defined as the internal pressure in the interstitial void volume at which the outside diameter of the insulation jacket takes on a permanent set at 25° C. greater than 2% (i.e., the OD increases by a factor of 1.02 times its original value), excluding any expansion (swell) due to fluid dissolved in the cable components. This limit can, for example, be experimentally determined by pressurizing a sample of the cable section with a fluid having a solubility of less than 0.1% by weight in the conductor shield and in the insulation jacket (e.g., water), for a period of about 24 hours, after first removing any covering such as insulation shield and wire wrap. Twenty four hours after the pressure is released, the final OD is compared with the initial OD in making the above determination. Further, this terminology is also applied to the "high-pressure connectors" which are specifically designed to inject the fluid and contain it at the above defined high pressure. It is also preferred that the amount of fluid so injected is at least 85 weight % of the amount (Q).

In one embodiment, the instant integrated restoration (or cable treatment) method is applied to at least one cable section, as defined above, which is in a loop configuration, such as found in a typical residential setting. In this configuration, several relatively high voltage (e.g., 15-35 kV rated) primary cable sections electrically connect a lesser number of transformers, which, in turn, distribute power to individual homes via considerably lower voltage secondary cables (e.g., 115 to 440 V). Such a loop incorporates a normally-open point between two of the transformers which interrupts the loop and effectively bifurcates it into branches which are individually fed from, e.g., an overhead line on a pole or from an underground feeder cable. Closing the normally-open point in this configuration allows the isolation of a single primary cable section with no disruption of power to utility customers, so this is the preferred and usual practice. The normally-open point is generally symmetrically located with respect to the transformers in the loop such that an approximately equal power load is carried on each side of this point and each side draws power from a separate feeder line. For a general discussion, see *The Lineman's and Cableman's Handbook*, 9$^{th}$ Edition, pp. 34.1-34.33, 1998.

The cable ends are then accessed at an enclosure (typically a transformer or switch and sometimes a pole-mounted switch) and, using methods well know in the art, the subject cable section is switched, de-energized, tested for the de-energized state with a voltmeter and grounded to effectively isolate it from the loop. Dead-front terminations are removed and the section is tested with a time domain reflectometer (TDR). Additionally, an RF transmitter of the kind well known in the art (e.g., Radio Detection RD 4000) is attached to impress a radio frequency tone on the cable segment. Together, these instruments identify precise locations of any neutral corrosion and splices, and their respective distances from the section ends. It should be noted that there is a subtle, but important, distinction between the distance and location of a given splice or corrosion site since the underground configuration of the cable section can be quite convoluted and one should know where to dig as well as the length of the run in order to make a complete assessment as to how to proceed.

A cost-benefit analysis is then undertaken to compare the incremental benefit of repair with the incremental cost to repair along with the cost of restoration versus replacement. This is a relatively straightforward economic evaluation which takes into consideration, among other things, the time value of money. The skilled artisan is further guided, e.g., by the following article when making this decision: Glen J. Bertini, IEEE/PES 1999 Summer Meeting, *Reliability Centered Maintenance*, (Jul. 21, 1999). In the unlikely event that the cost is greater than the perceived benefit, abandon the effort; otherwise proceed to the next step.

Pit(s) are then dug to expose the splice(s) and/or corrosion sites which were located in a previous step. Although shovels, backhoes/excavators or vacuum excavators may be used, the latter are particularly preferred since they facilitate the rapid excavation of the pits. In this regard, it is also preferred that the vacuum excavation equipment employs very-high-pressure supersonic air cutting for optimum performance. Such vacuum excavation equipment is commercially available from, e.g., Vacmasters (Arvada, Colo.; http://iwww.vacmasters.com). In any event, the means for digging the pits should be available at the segment site, as needed.

All preexisting conventional splice connectors and terminal connectors associated with the cable section are replaced with high-pressure splice and terminal connectors, respectively. Additionally, any corrosion is optionally repaired using methods well known in the art (e.g., as described at IEEE P1617/D2.0, Draft Guide for Detection, Mitigation and Control Of Concentric Neutral Corrosion in Medium Voltage Underground Cables). Suitable high-pressure connectors are described further below and in previously cited United States Patent Application Publication No. 2005/019190 A1.

A specific swagable high-pressure terminal connector of the type disclosed in Publication No. US 2005/0191910, and use thereof to inject fluid into a cable, is described as follows. As shown in FIG. 1, the insulation jacket 12 of a cable section 10 is received within a first end portion of a housing 130 of the connector 110. The first end portion of the housing 130 is sized such that its internal diameter (ID) is just slightly larger than the outer diameter (OD) of insulation jacket 12. As will be described in greater detail below, a swage is applied to the exterior of the first end portion of the housing 130 over an O-ring 134 which resides in an interior circumferentially-extending O-ring groove 135 in housing 130, multiple interior circumferentially-extending Acme thread-shaped grooves 138 in the housing, and an interior circumferentially-extending generally trapezoidal groove 136 in the housing. This insulation swaging region is shown in detail in the DETAIL A of FIG. 1 and enlarged in FIG. 2.

Figure 2:
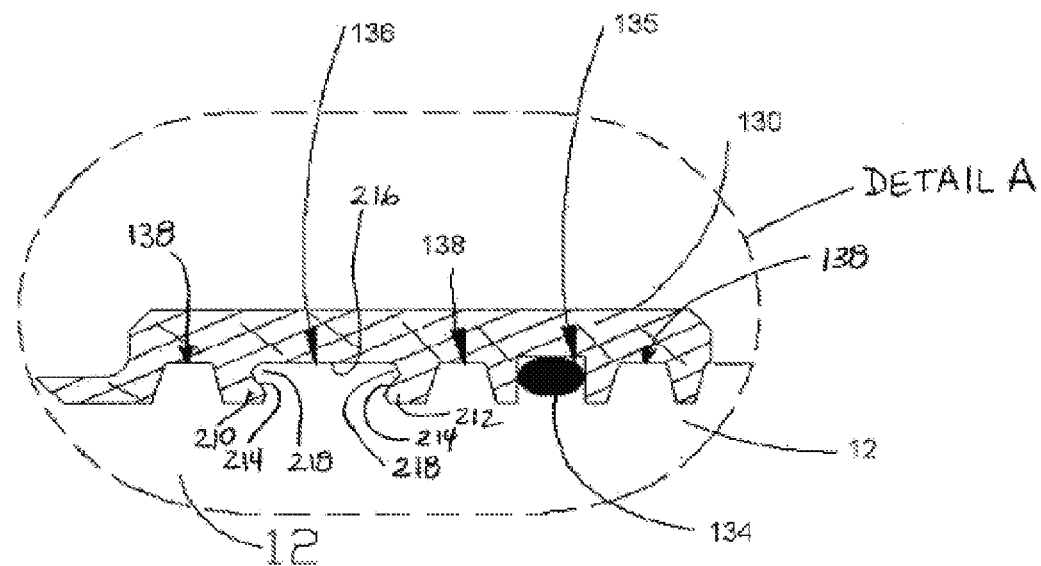
FIG. 2 is a cross-sectional view of detail area A of FIG. 1 showing the swaging region over the insulation jacket.

Referring to FIGS. 1 and 2, the trapezoidal groove 136 has a pair of oppositely-oriented, axially-projecting circumferentially-extending spurs 210 and 212. The spurs 210 and 212 are disposed essentially at an interior wall of the housing 130, and project in opposite axial directions and toward each other. The spurs 210 and 212 are provided by forming the circumferential groove 136 in the interior wall of the housing 130 at an axial position along the first end portion of the housing within the above described insulation swaging region over the insulation jacket (i.e., within the engagement portion of the housing). The circumferential groove 136 and the spurs 210 and 212, extend completely around the inner circumference of the inner wall of the housing 130. Each spur 210 and 212 has a generally radially outward facing wall 214 spaced radially inward from a radially inward facing recessed wall portion 216 of the housing 130 located within the groove. A pair of circumferentially-extending recesses 218 within the groove 136 are defined between the radially outward facing walls 214 of the spurs 210 and 212 and the radially inward facing recessed wall portion 216 of the housing 130. The recesses 218 form axially-opening undercut spaces located radially outward of the spurs within which a portion of the insulation jacket 12 of the cable section 10 is pressed and at least partially flows as a result of the swage applied to the exterior of the first end portion of the housing 130 in the insulation swaging region described above and the cable being placed in service. This operation forces at least some polymer of insulation jacket 12 into the groove 136 and further into the recesses 218 (i.e., into the undercuts). Essentially, the polymer of the insulation jacket 12 within the groove 136 and the groove itself form an interlocking joint, much like a dovetail mortise and tenon joint or union. As a result, a fluid-tight seal is formed between the insulation jacket 12 and the housing 130, which not only prevents pushback of the insulation jacket, but also provides leak-free operation when the cable segment contains fluid at elevated pressure and is subjected to substantial thermal cycling that otherwise might cause relative radial movement and separation of the insulation jacket and the housing, and hence fluid leakage during the cooling phase of a thermal cycle. For the purposes herein, "substantial thermal cycling" refers to thermal cycling wherein the mode (i.e., peak) of the distribution with respect to time of ΔT, the difference between the high and low conductor temperatures, is at least about 20° C.

In the high-pressure connector shown in FIGS. 1 and 2, the insulation swaging region over the insulation jacket 12 (engagement portion of the housing 130) comprises at least one trapezoidal housing groove 136 as well as the O-ring 134, the latter residing in the separate O-ring groove 135. FIG. 1 shows a partial cross-sectional view of an injection tool 139 clamped in position over the swagable high-pressure terminal connector 110 just prior to injection of dielectric enhancement fluid into the cable section 10, as further described below. In a typical assembly procedure using this embodiment, the insulation jacket 12 of cable section 10 is first prepared for accepting a termination crimp connector 131 of the connector, as described in above cited Publication No. US 2005/0191910. The housing 130 of the connector 110 includes an injection port 48 (see detail B, FIG. 3). As described above, the housing is sized such that its larger internal diameter (ID) at the first end portion of the housing is just slightly larger than the outer diameter (OD) of insulation jacket 12 and its smaller ID at an opposite second end portion is just slightly larger than the OD of the termination crimp connector 131. The housing 130 is slid over the conductor 14 of the cable section 10 and over the insulation jacket 12 of the cable section, and the termination crimp connector 131 is then slipped over the end of the conductor 14 and within the housing. The second end portion of the housing 130, having first O-ring 104 residing in a groove therein, is first swaged with respect to termination crimp connector 131. This first swage is applied over the first O-ring 104 and the essentially square machined interior teeth 108 of the housing 130. Swaging can be performed in a single operation to produce swaging together of the conductor 14 and the termination crimp connector 131, and swaging together of the housing 130 and the termination crimp connector 131. Alternatively, swaging can be performed in phases (wherein the termination crimp connector 131 is swaged together with conductor 14 before the housing 130 is swaged together with the resulting termination crimp connector/conductor combination. This swaging operation joins the conductor 14, the termination crimp connector 131, and the housing 130 in intimate mechanical, thermal and electrical union and provides a redundant seal to the O-ring 104 to give a fluid-tight seal between the housing 130 and the termination crimp connector 131. It is also possible to perform the swaging operation over the insulation before swaging over the conductor, but the above sequence is preferred.

In FIG. 1, a copper termination lug 133 is spin welded to the aluminum termination crimp connector 131 to provide a typical electrical connection. The swaged assembly is then (optionally) twisted to straighten the lay of the outer strands of the conductor 14 to facilitate fluid flow into and out of the strand interstices. A second swage is then applied to the exterior of the first end portion of the housing 130 over the second O-ring 134 (which resides in the separate interior groove 135 in the housing 130), the Acme thread-shaped grooves 138, and the trapezoidal groove 136 (i.e., over the insulation swaging region of DETAIL A of FIG. 1 and enlarged in FIG. 2). O-rings 104 and 134 can be fabricated from a fluoroelastomer such as Viton®, ethylene-propylene rubber (EPR), or, preferably, ethylene-propylene diene monomer (EPDM) rubber while housing 130 is preferably made of stainless steel. This swaging operation forces at least some polymer of insulation jacket 12 into the trapezoidal groove 136 and the Acme thread grooves 138, while simultaneously deforming O-ring 134 to the approximate shape depicted in FIG. 2. As a result, a fluid-tight seal is formed between insulation jacket 12 and the first end portion of the housing 130, which seal prevents pushback of the insulation and provides leak-free operation when the cable section 10 contains fluid at elevated pressure and is subjected to substantial thermal cycling, as described above. At this point, the swaged connector 110, and cable section 10 to which it is attached, is ready to be injected with a dielectric enhancement fluid at an elevated pressure.

Figure 3:
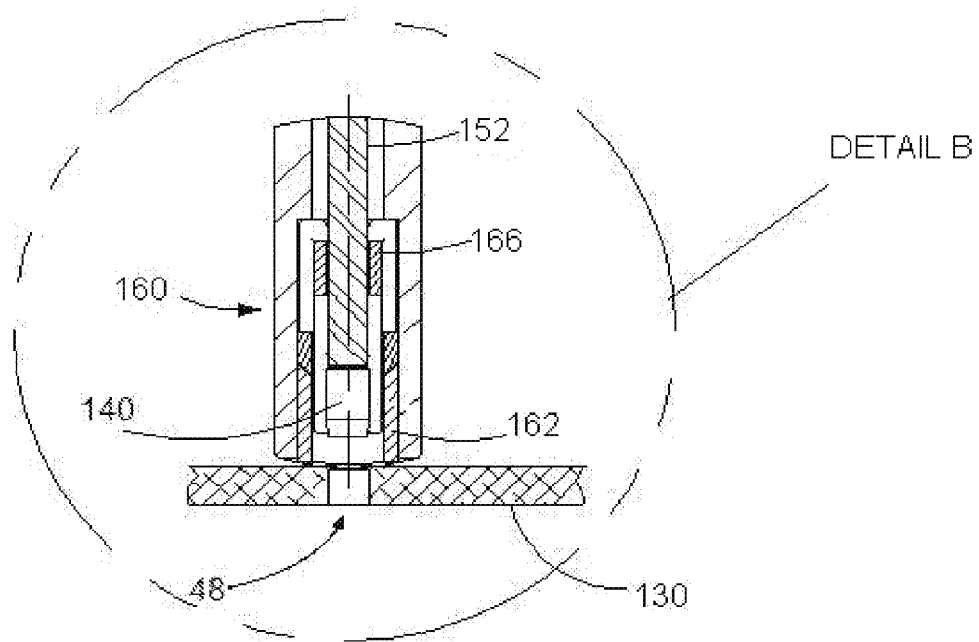
FIG. 3 is a cross-sectional view of detail area B of FIG. 1 showing the seal tube and injector tip.
Figure 4:
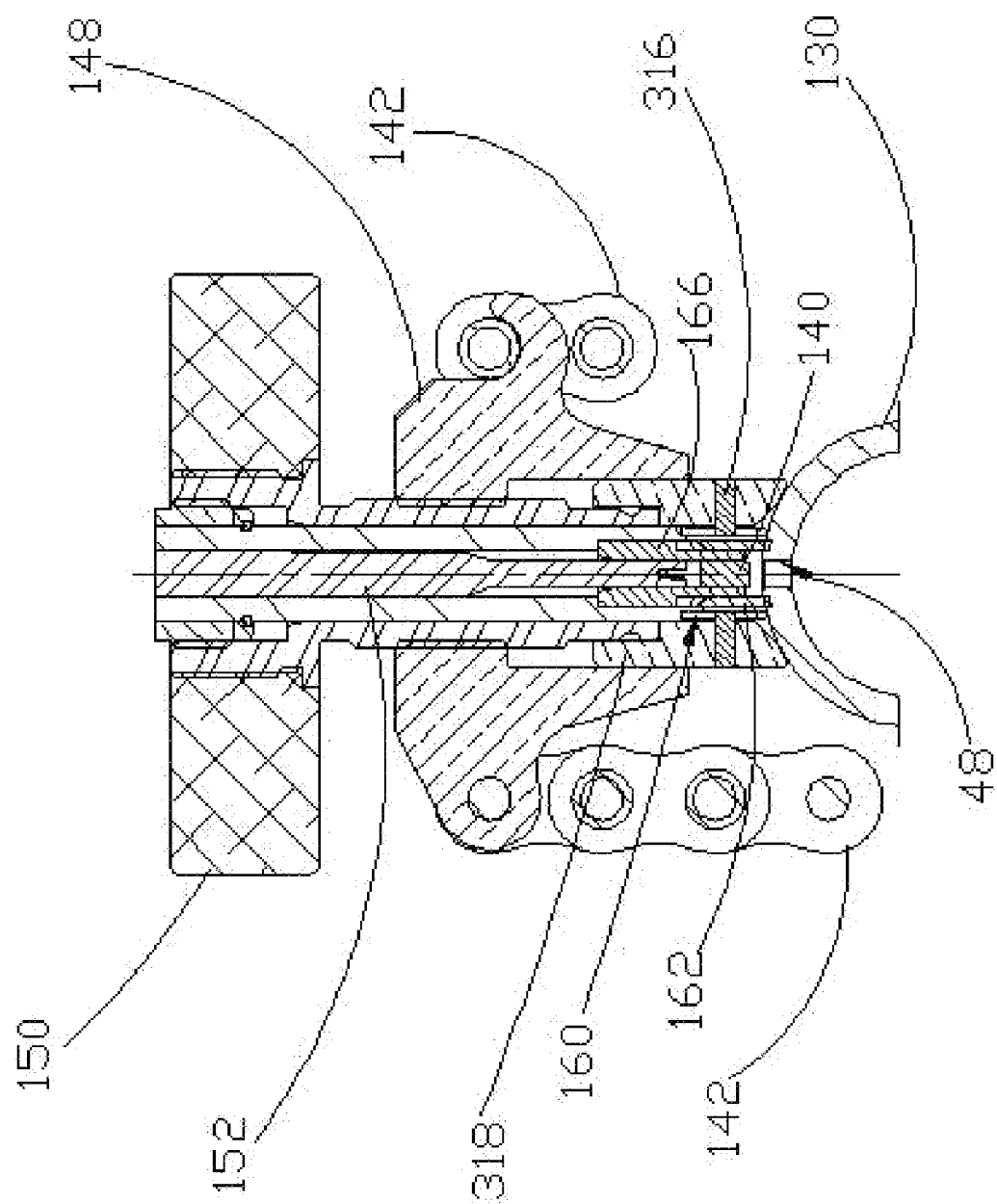
FIG. 4 is an enlarged cross-sectional view of the lower portion of the injection tool shown in FIG. 1 along the axial direction of the injection tool.
Figure 6:
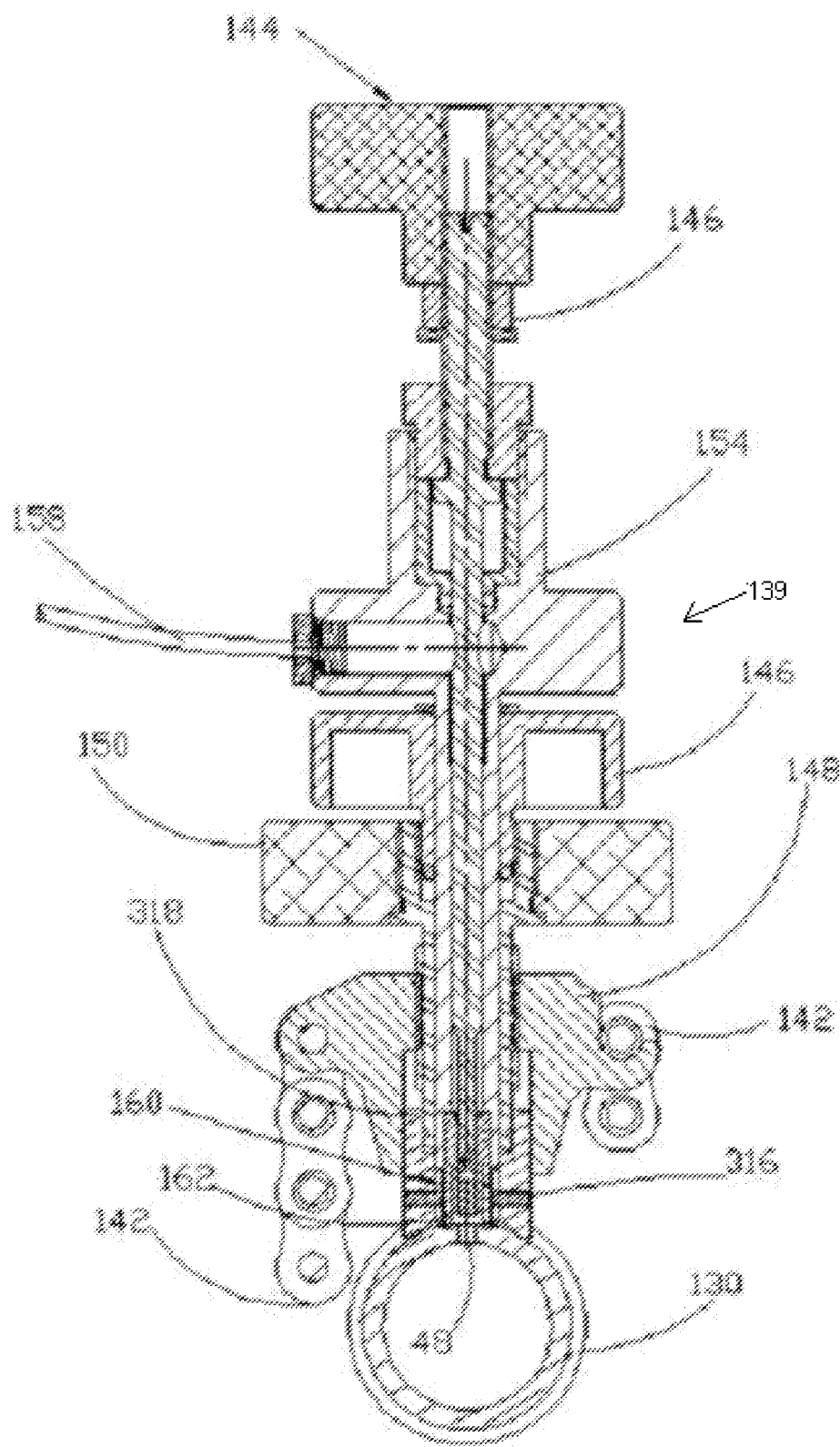
FIG. 6 is an enlarged cross-sectional view of the injection tool shown in FIG. 1 along the axial direction of the injection tool.

In a typical injection procedure, a plug pin 140, further described below, is loaded into a seal tube injector tip 160 of injection tool 139 such that it is held in place by spring collet 166, as shown in FIG. 3. Spring collet 166 comprises a partially cutout cylinder that has two 180° opposing "fingers" (not shown) which grip plug pin 140 with sufficient force such that the latter is not dislodged by handling or fluid flow, but can be dislodged when the plug pin 140 is inserted into injection port 48, as shown in detail in FIG. 3. The dielectric enhancement fluid to be injected, further describe below, can flow between these "fingers" of spring collet 166. Referring to FIGS. 1 and 3, yoke 148 is positioned over housing 130 and its center line is aligned with injection port 48 using a precision alignment pin (not shown), the latter being threaded into yoke 148. The precision alignment pin brings the axis of clamp knob 150 and injection port 48 into precise alignment. Clamp chain 142, attached at a one side to yoke 148, is wrapped around housing 130 and then again attached to a hook on the other side of yoke 148. The now loosely attached chain is tightened by turning clamp knob 150 (by means of threads-not shown). The precision alignment pin is unthreaded and removed from the yoke 148. Injection tool 139 is threaded into the yoke 148 and seal knob 146 is then threaded into clamp knob 150 to compress a polymeric seal 162 against the exterior of housing 130, the entire injection tool 139 now being in precise alignment with injection port 48. At this point there is a fluid-tight seal between the seal tube injector tip 160 and the housing 130, thereby providing a flow path (for fluid) through injection port 48 between the interior of the injection tool 139 and the interior of the housing 130, as shown in FIG. 3. For further clarity, FIGS. 4 and 6 provide enlarged cross-sectional views of (at least a portion of) the injection tool 139 in a direction along the axial direction of housing 130. These figures show slide block 318 which presses against the housing 130 with a force equal to approximately twice the tension of chain 142. Guide pins 316 align with slots in the seal tube injector tip 160 and orient it with respect to housing 130 such that the axes of their respective curvatures are aligned, thus allowing a fluid-tight seal to be made.

Figure 5:
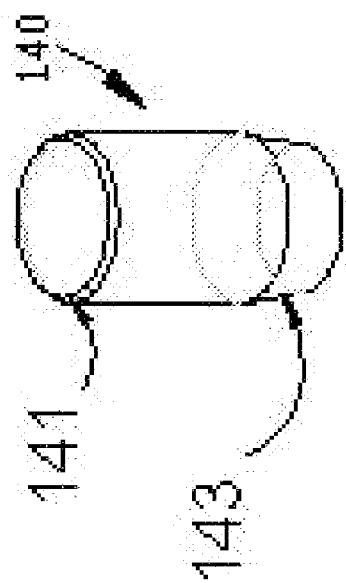
FIG. 5 is a perspective view of a plug pin used to seal the injection port of the connector shown in FIG. 1.

Pressurized dielectric enhancement fluid is then introduced to the interior of connector 110 and the interstitial void volume of cable section 10 via a tube 158, seal tube inlet 154 and an annulus (not shown) formed between the seal tube injector tip 160 and the assembly of the press pin 152 and the plug pin 140. After the predetermined amount of fluid has been introduced (or a predetermined uniform pressure along the full length of the cable segment has been attained, as described in detail in above cited United States Patent Application Publication No. 2005/0189130 A1), a press pin actuator knob 144 is tightened (utilizing mated threads in the injection tool 139—not shown) so as to advance press pin 152 toward injection port 48, thereby pushing plug pin 140 into injection port 48 such that the nominally circular end surface of plug pin 140, located adjacent to a first chamfered end 141 of the plug pin, is essentially flush with the exterior surface of the housing 130. The first chamfered end 141 of the plug pin 140, illustrated in perspective view in FIG. 5, assures a post injection "no snag" exterior surface for the finished assembly of housing 130. The plug pin 140 has as a diameter slightly larger than the diameter of injection port 48 to provide a force fit therein. Finally, plug pin 140 also has a second chamfered end 143 to allow self-guidance into injection port 48 and to allow the force fit with injection port 48 to create a fluid-tight seal. Plug pin 140 can subsequently be pushed into the interior of the connector 110 in the event that additional fluid is to be injected or the system needs to be bled for any reason, and later a slightly larger plug pin can be re-inserted. At this point, the pressurized fluid supply is discontinued and injection tool 139 is disconnected from connector 110 to complete the injection process. Implicit in the above description of the injection step is the presence of a similar splice (or terminal) high-pressure connector at the other end of the cable section being injected at elevated pressure, as required by the instant integrated method. Thus, when the interstitial void volume of the section is completely filled, and preferably partially bled at the end opposite from the injection end of the cable section, the fluid is confined within the interstitial void volume of the section as well as within the high-pressure connectors, thereby introducing the required amount of the fluid to the section which has insufficient interstitial volume, as discussed above and in previously cited United States Patent Application Publication No. 2005/0189130 A1. As in the case of the latter method, it is contemplated herein that the dielectric property-enhancing fluid may be supplied at a pressure greater than about 50 psig for more than about 2 hours before being confined within the interstitial void volume. Those skilled in the art will also readily appreciate that, while the description of the above embodiment illustrates injection through a terminal high-pressure connector, the cable section 10 can be a cable segment or a cable sub-segment, as defined above. Thus, for example, it is contemplated herein that the cable section could comprise at least one high-pressure splice comprising two connectors of the type shown in FIG. 1 which are swaged to opposite ends of a splice strand connector, as illustrated by the (similar) dual housing high-pressure splice connector shown in FIG. 8 of above cited United States Patent Application Publication No. 2005/019190 A1. It is further contemplated herein that, after replacing the existing connectors according to the present integrated method, the cable section has a first closable high-pressure connector attached at one terminus thereof and a second closable high-pressure connector attached at another terminus thereof, each of these high-pressure connectors providing fluid communication to the void volume, wherein the method further comprises (a) opening both said first and second high-pressure connectors and introducing at least one dielectric property-enhancing fluid via the first high-pressure connector so as to fill the interstitial void volume; (b) closing the second high-pressure connector and introducing an additional quantity of the dielectric property-enhancing fluid via the first connector at a pressure greater than about 50 psig, but less than the elastic limit of said polymeric insulation; and (c) closing the first high-pressure connector so as to contain the dielectric property-enhancing fluid within the void volume at a residual pressure greater than about 50 psig, but below said elastic limit.

The dielectric enhancing fluid of the present integrated method (also referred to as a tree retardant agent or anti-treeing agent herein) may be selected from at least one of the compounds known to prevent water trees in polymeric insulation when compounded into the insulation and/or injected into a new cable or an in-service cable. Such compounds as sulfur hexafluoride, aromatic ketones (e.g., acetophenone), fatty alcohols (e.g., dodecanol), UV stabilizers (e.g. 2-hydroxy-4-n-octyloxy-benzylphenone), and organoalkoxysilanes which preferably contain aromatic unsaturation illustrate the range of suitable anti-treeing agents which can be employed as the dielectric enhancing (restorative) fluid in the present integrated method. Many such systems have been described in the patent literature and the interested reader is referred to U.S. Pat. No. 4,144,202 to Ashcraft et al., U.S. Pat. No. 4,212,756 to Ashcraft et al., U.S. Pat. No. 4,299,713 to Maringet et al., U.S. Pat. No. 4,332,957 to Braus et al., U.S. Pat. No. 4,400,429 to Barlow et al., U.S. Pat. No. 4,608,306 to Vincent, U.S. Pat. No. 4,840,983 to Vincent, U.S. Pat. No. 4,766,011 to Vincent et al, U.S. Pat. No. 4,870,121 to Bamji et al., U.S. Pat. No. 6,697,712 to Bertini et al. and U.S. Pat. No. 5,372,841 to Kleyer et al., and above cited United States Patent Application Publication No. 2005/0189130 A1, among others.

Thus, for example, the fluid can be a mixture comprising (a) at least one antitreeing agent; and (b) a water-reactive compound having a diffusion coefficient of greater than $10^{-7}$ cm$^2$/second at 50° C. in the polymeric insulation jacket, the mixture having an initial viscosity of <100 cP at 25° C., wherein components (A) and (B) are different, as taught in U.S. Pat. No. 5,372,841. Preferably, component (A) of this fluid is at least one aryl-functional alkoxysilane and component (B) is at least one water-reactive compound selected from the group consisting of trimethylmethoxysilane and dimethyldimethoxysilane. More preferably, the above aryl-functional alkoxysilane is selected from phenylmethyldimethoxysilane, phenyltrimethoxysilane, diphenyldimethoxysilane, or phenylmethyldiethoxysilane.

Further, the dielectric enhancement fluid, or at least one component thereof, can have a diffusion coefficient between about $10^{-8}$ and about $10^{-7}$ cm$^2$/second at 50° C. in the polymeric insulation of the cable.

Highly preferred fluids of the instant integrated method are mixtures of aromatic alkoxysilanes and acetophenone containing a condensation catalyst, as exemplified by a catalyzed mixture of 25 parts by weight of acetophenone with 75 parts by weight of p-tolylethylmethyldimethoxysilane. The catalysts contemplated herein are any of those known to promote the hydrolysis and condensation of organoalkoxysilanes, provided they do not adversely affect the cable components (e.g., they do not corrode copper or aluminum conductors). Typically, these are selected from organometallic compounds of tin, manganese, iron, cobalt, nickel, lead, titanium or zirconium. Examples of such catalysts include alkyl titanates, acyl titanates and the corresponding zirconates. Specific non-limiting examples of suitable catalysts include tetra-t-butyl titanate (TBT), dibutyltindiacetate (DBTDA), dibutyltindilaurate (DBTDL), dibutyltindioleate, tetraethylorthotitanate, tetraisopropyl titanate (TIPT), tetraoctadecylorthotitanate, dibutyltindioctoate, stannous octoate, dimethyltinneodeconoate, di-N-octyltin-S,S-isooctylmercaptoacetate, dibutyltin-S,S-dimethylmercaptoacetate, or diethyltin-S,S-dibutylmercaptoacetate. In general, the catalyst is added at a level of about 0.05 to about 5% based on the total weight of the organoalkoxysilane components. More typically, it is supplied at a level of about 0.1 to about 2% or at a level of about 0.2 to 1% by weight according to the above mentioned basis.

Specific catalyzed formulations are illustrated in Table 1, below, wherein TIPT is used in proportion to the total amount of alkoxysilanes in a given formulation.

TABLE 1

| Component | Formulation Number and Component Weight % | | | | | |
|---|---|---|---|---|---|---|
| | 10 | 20 | 30 | 40 | 50 | 60 |
| Acetophenone | 17.67% | 16.85% | 15.73% | 14.11% | 11.57% | 7.00% |
| tolylethyl-methyl-dimethyloxysilane | 54.67% | 52.77% | 50.18% | 46.44% | 40.57% | 30.00% |
| 2-cyanobutyl-methyl-dimethoxysilane | 16.67% | 19.23% | 22.73% | 27.78% | 35.71% | 50.00% |
| Menthylanthranilate | 0.03% | 0.04% | 0.05% | 0.06% | 0.07% | 0.10% |
| Avobenzone | 2.49% | 2.48% | 2.47% | 2.46% | 2.44% | 2.40% |
| Octocrylene | 1.00% | 1.15% | 1.36% | 1.67% | 2.14% | 3.00% |
| Ferrocene | 6.77% | 6.76% | 6.75% | 6.74% | 6.73% | 6.70% |
| TIPT | 0.71% | 0.72% | 0.73% | 0.74% | 0.76% | 0.80% |
| Total | 100.00% | 100.00% | 100.00% | 100.00% | 100.00% | 100.00% |

Figure 7:
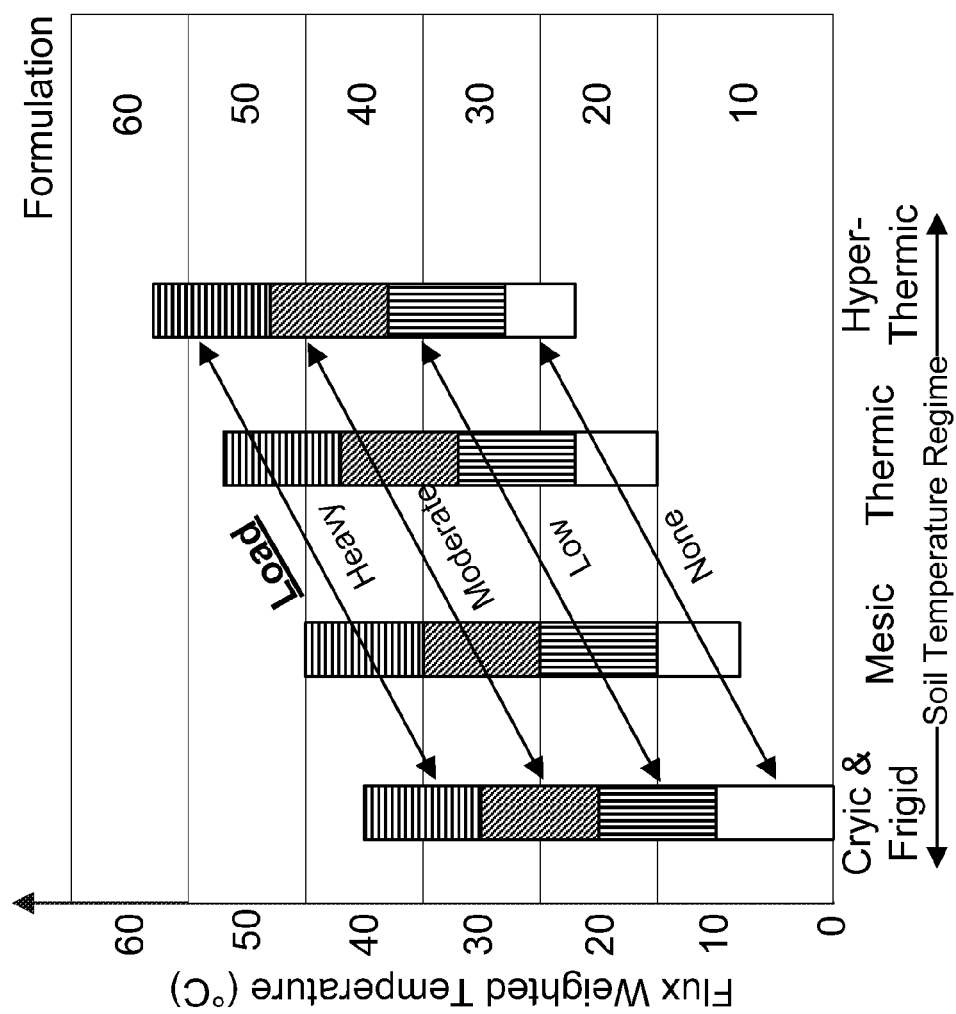
FIG. 7 is a chart showing operating conditions of a cable and provides a guide for the use of specific dielectric enhancement fluid formulations.

The particular formulation to be used in the present integrated method may be selected from Table 1 based on the operating conditions of the cable, as delineated in FIG. 7. First, the soil temperature of the cable is selected from one of four soil regimes, defined as follows:

| Cryic (or frigid) soil | 0-10° C. |
|---|---|
| Mesic soil | 8-15° C. |
| Thermic soil | 12-22° C. |
| Hyperthermic soil | 22-28° C. |

The above categories are representative of over 90% of underground cables in the world. It should, however, be noted that, although the cable depth is typically 1 meter, these soil temperature regimes are defined by soil scientists at 0.5 meters. Next, the electrical load of the cable is selected from one of the following load groupings: low, moderate, or heavy. The above four soil conditions and three load conditions result in 12 possible combinations, including some overlap, as shown schematically in FIG. 7, wherein the ordinate represents the average operating temperature of the cable. Thus, when soil and load conditions are known, FIG. 7 provides a guide to the preferred formulation to be used in the instant integrated method, as indicated by the right hand legend of FIG. 7.

The amount of a dielectric enhancement fluid (or fluid mixture having more than one component) to be injected is calculated according to the instant integrated method as follows. For a multi-component formulation, the solubility of each component of the selected fluid in the conductor shield is multiplied by the weight of the conductor shield of the subject cable section to arrive at the weight of the respective pure component needed to saturate the shield thereof. In a similar manner, the solubility of each component in the insulation jacket is multiplied by the weight of the insulation jacket under consideration to arrive at the weight of the respective pure component needed to saturate the insulation jacket. In each case, the solubility value is determined at the maximum soil temperature at the actual cable depth. Each such pure component saturation weight is then multiplied by the respective weight fraction of the pure component in the formulation to provide a weighted saturation level. Summation of these weighted saturation levels for each component of the fluid in the shield and insulation provides the total amount (Q) of fluid which will saturate the conductor shield and the insulation jacket.

This calculation is illustrated for one cable layer (e.g., the conductor shield) in Table 2 below for a hypothetical three component fluid mixture of A, B, and C. In this table, $T_{max}$ is the above mentioned maximum soil temperature at the actual cable depth, M is the mass of the cable layer under consideration (the conductor shield in this case), $Q_{layer}$ is the portion of Q which is required for this layer. A similar calculation is then made for the other layer of the cable (i.e., the insulation jacket in this example). Q is the sum of the $Q_{layer}$ values for the conductor shield and the insulation jacket.

TABLE 2

| Component | Component Content in Fluid (wt. %) | Solubility in Insulation Jacket at $T_{max}$ (wt. %) | Mass of Component in Insulation Jacket |
|---|---|---|---|
| Component A | 20% | 5% | 0.01 M |
| Component B | 50% | 4% | 0.02 M |
| Component C | 30% | 1% | 0.003 M |
| Total | 100% | | $Q_{layer}$ = 0.033 M |

Of course, when there is only one component, (Q) represents the total amount of this component which will saturate the shield and insulation. The amount of fluid actually introduced is at least about 75% by weight of this total saturation amount (Q). Treatment with less than about 75% of the above total saturation amount typically does not provide adequate long-term dielectric performance. On the other hand, introduction of too much fluid may not be desired since it can result in "over saturation." Over saturation is defined herein as the introduction and dissolution of a relatively soluble component (e.g., one having a solubility in the insulation of greater than about 3 weight % at cable operating temperatures) which can lead to excessive swelling of the insulation and result in degradation of the mechanical properties thereof. It is generally preferred that the total amount of fluid introduced is no more than would result in a dissolved fluid concentration in the insulation polymer of about 3 weight %.

Generally, the above solubility values for the various components contemplated are determined at about 0-28° C. depending on the prevailing temperature profile and soil of the cable site and are expressed in weight of the respective component per weight of the insulation or conductor shield material, as appropriate. These solubility values are predetermined and are preferably available in tabular or graphical form during the planning portion of the injection to facilitate the above calculations. The geometry of the subject cable section determines the weights of the insulation jacket and conductor shield to be used in the above calculations, and corresponding tables or graphs are also preferably employed during planning. The calculated amount of fluid or fluid mixture is injected into the section using, e.g., a metering pump or pressurized feed bottle, the ultimate pressure attained and subsequently confined in the interstitial void volume being fixed by this procedure. Alternatively, the pressure to be used to inject the appropriate amount of fluid can be determined from a previously obtained graph of interstitial void volume as a function of pressure. The latter approach, as well as a more detailed description of preferred ways to select optimum fluid compositions and amounts thereof suitable for use in the high-pressure injection of a cable, is known in the art and addressed in previously cited United States Patent Application Publication Nos. 2005/0192708 A1 and 2005/0189130 A1 and they may be employed in carrying out the present integrated method.

After injection is complete and the dielectric enhancement fluid is confined within the interstitial void volume, as well as within the high-pressure splice and/or terminal connectors, at a residual high pressure similar to that used for the injection, insulation or stress control is applied over each connector, as required. This may be accomplished with the application of shrink-to-fit or molded splices and terminations or by other methods, as commonly practiced in the art. Preferably for dead-front devices, insulating splice bodies or elbow bodies incorporating semi-conductive stress relief are designed to fit over the respective high-pressure splice and terminal connectors, these also being known in the art. The cable neutrals are then connected according to industry practice.

The excavated soil is next replaced and any damage to landscaping or pavement is generally repaired. This is greatly facilitated when supersonic air is used since a 55-gallon cyclone is employed adjacent to the pit and the dry spoils are collected therein. The native soil can then be easily reintroduced to the pit. If water is used to cut the soil, new soil is generally used to replace the spoils. Finally, the cable is re-energized and all transformer enclosures are closed. Because vacuum excavation equipment and attendant crew are available at the cable site according to a preferred embodiment of the instant integrated method, the whole operation, from switching out to re-energizing the section, can typically be accomplished in one visit to the section site.

Although not required to effectively practice the instant integrated method, the following additional elements are preferably included:

As further described in detail in previously cited United States Patent Application Publication No. 2005/019190 A1, all of the high-pressure splice connectors used in the instant integrated method preferably have independent dual-flow direction capability to facilitate parallel injection of cable sub-segments. This can greatly reduce overall injection time for the cable segment due to the non-linear decrease in injection time for shorter sub-segment lengths. Thus, from first principles of fluid dynamics, the time to fill each incremental length of the interstitial void volume is an ever-increasing value. As each unit length of cable is filled, the drag necessarily increases and hence, at constant injection pressure, the flow rate declines as fluid advances along the flow path. It follows, then, that simultaneous injection from splices, wherein the cable segment is subdivided into smaller hydrodynamic sub-segments, reduces the total injection time for all cases where a splice has to be replaced, as required by the instant integrated method. Thus, a sub-segmentation strategy can be advantageously implemented in the instant integrated method wherein a long cable run is intentionally subdivided by the introduction of one or more high-pressure splices (where there were none before) to reduce the overall injection time for the total cable section. This is particularly beneficial when the conductor comprises relatively few strands or contains compacted strands which significantly limit flow rates. The above described cost-benefit analysis can be modified to include the financial impact of adding one splice or several splices to the run near long segment break points (i.e., the point chosen to add a splice—it would generally be near the middle of the longest sub-segment). Obviously, this strategy would only be undertaken when the cost of adding the new pit(s) and splice(s) is less than the savings from the shorter injection time (i.e., considering labor and equipment time).

An isolation strategy can also be used in conjunction with the required steps of the instant integrated method to expedite subsequent replacement of problematic sub-segments which are abandoned after the initial visit to the site. Examples of problematic sub-segments include splices under roadways or expensive driveways which are not easily excavated or where there are substantial runs of corroded neutral. According to this strategy, two high-pressure splice connectors are introduced (where there were none before) to isolate the problem area such that the subsequent replacement of the abandoned sub-segment can be performed without disruption to the newly installed high-pressure splice connectors. These high-pressure splice connectors are preferably of a modular plug type, as described in above cited United States Patent Application Publication No. 2005/0191901 A1, so that the problem sub-segment can be replaced with a new one at a later time and the latter (also fitted with modular connectors) is then merely plugged into the modular connectors provided. Again, when problematic sub-segments are encountered, the cost-benefit analysis described above can be modified to include the financial impact of adding the extra high-pressure splice connectors. Obviously, this would only be undertaken when the cost of adding the new pit(s) and splice(s) was less than the alternative of replacing the entire cable section. Ideally, directional drilling and cable pulling equipment is also made available at the site, or on a standby basis, in the event that some sub-segment paths are inaccessible and replacement becomes necessary. This type of equipment is available from several manufacturers (e.g., Ditchwitch, Vermeer, Baker Hughes, Case) and its on-site inclusion is often economically justified when the size of the total reclamation job is large.

The present integrated method provides several substantial features not found in the prior art methods since each cable section is switched only once and each cable section is, preferably, also visited only once. Besides the reduction in the total labor involved to inject a typical URD cable section (or one having insufficient interstitial volume, as defined above), the instant integrated method minimizes the exposure of personnel to energized equipment, thereby greatly reducing risk of injury.

Another feature of the instant integrated method is that it does not require the desiccant injection step of the prior art. The labor involved in providing desiccant, the extra cost of desiccant materials, disposal costs, extra retardant fluid required to flush the desiccant, and disposal of the additional retardant fluid represent significant time and costs. The present integrated method eliminates the need for expensive desiccation by replacing all of the conventional splices and terminations with corresponding high-pressure connectors which are designed to hold at least 1.5 times the pressure required to properly treat the cable. While a low-pressure spice may be configured in flow-though mode and injected in the conventional way, it is preferred to inject the cable section at pressures from 300 to 1000 psig. This pressure is sufficiently high to generally blast past even the most tenacious aluminum corrosion as well as clear out any fluid or contaminants from the interstitial void volume. Further, interstitial reaction of a typical organoalkoxysilane with adventitious water is irrelevant since filling times are generally less than 180 minutes, and a slight increase in viscosity will have little impact on filling time. The time required to inject these slow-flowing cables is minimized with the sub-segment injection approach previously described. In short, the present integrated method entirely eliminates the need for the prior art desiccant by assuring that the cable segments and sub-segments are filled entirely while the cable is de-energized and with very little elapsed time.

Another feature of the instant integrated method is that it eliminates the need to carry out the expensive flow and pressure tests on cable segments or sub-segments, as practiced by the prior art, by replacing all of the splices and terminations. Again, the pressures employed by the instant integrated method are sufficient to blast past even the corrosion points. Thus, the time to inject these slow-flowing cables can be minimized with sub-segment injection, described above, and, since all potential sources of blockages or leaks (i.e., splices) are addressed preemptively, there is no need to perform flow and pressure checks.

Yet another feature of the instant integrated method is that it incorporates vacuum-free injection and thereby eliminates the need for this time consuming, costly, and, with energized cable, dangerous use of vacuum, as described in the background section. The pressures contemplated herein, particularly those in the preferred 300 to 1000 psig range, are sufficiently high that the use of a 14 psig vacuum is largely irrelevant, most typically this level representing less than 5% of the applied hydraulic driving force. Moreover, because any small gas bubbles in the interstices will quickly dissolve in the dielectric enhancement fluid at the contemplated high pressures which are maintained after the injection is complete, as described in greater detain in United States Patent Application Publication No. 2005/0189130 A1, there is no need to be concerned about trapped gas bubbles reducing the amount of fluid injected.

It is also well established that circuit owners and underground electrical construction service suppliers prefer the restorations to be carried out in the smallest possible aggregates of activity so that circuits in residential area can be restored to their normal, or close-to-normal, condition before the end of the usual work day. Children returning from school and adults returning from work do not appreciate seeing heavy equipment and utility contractors blocking their streets. Further, as the work day nears its end, workers become reluctant to begin another section if the time to complete the work is likely to disrupt their own evening plans. Hence, the reduction of the total time to treat a given cable section, as contemplated in the instant integrated method, has significant productivity ramifications and those skilled in scheduling and managing trained field craftspeople will readily appreciate the benefits of having the elements of the instant integrated method at hand.

It is thus seen that the instant integrated method can be carried out without the use of a vacuum bottle, without the use of a soak period, and without the use of an external dielectric enhancement fluid reservoir.

The invention claimed is:

1. A method for extending the useful life of at least one in-service electrical cable section having at least two existing connectors attached thereto, said cable section having a stranded conductor surrounded by a conductor shield encased in a polymeric insulation jacket and having an interstitial void volume in the region of the conductor, said method comprising:
   (a) replacing each said existing connector with a corresponding high-pressure connector; and
   (b) injecting a dielectric enhancement fluid into the interstitial void volume of said cable section and confining said fluid therein at a pressure sufficient to introduce at least about 0.75 Q of said fluid, wherein Q represents the weight of said fluid which would saturate said conductor shield and said insulation jacket, the interstitial void volume of said cable section at atmospheric pressure is less than that which would accommodate said amount 0.75 Q, and wherein said method is carried out using only a single switching cycle.

2. The method according to claim 1, wherein said cable section is in a loop configuration.

3. The method according to claim 1, wherein said method is carried out in a single visit to said cable section.

4. The method according to claim 1, wherein said dielectric property-enhancing fluid is supplied at a pressure greater than about 50 psig for more than about 2 hours before being confined within in said interstitial void volume.

5. The method according to claim 1, wherein said pressure is between about 100 psig and about 1000 psig.

6. The method according to claim 5, wherein said pressure is between about 300 psig and about 600 psig.

7. The method according to claim 1, wherein said pressure is sufficient to introduce at leas about 85 weight % of said quantity Q.

8. The method according to claim 1, wherein said dielectric enhancement fluid comprises at least one component having a diffusion coefficient between about 10-8 and about $10^{-7}$ cm$^2$/second at 50° C. in said polymeric insulation.

9. The method according to claim 1, wherein said dielectric enhancement fluid comprises at least one aromatic organoalkoxysilane.

10. The method according to claim 9, wherein said dielectric enhancement fluid further comprises a condensation catalyst.

11. The method according to claim 10, wherein said dielectric enhancement fluid further comprises at least one component selected from acetophenone, 2-cyanobutyl-methydimethoxysilane, menthylanthranilate, avobenzone, octocrylene, or ferrocene.

12. The method according to claim 11, wherein said aromatic alkoxysilane is tolylethymethyldimethyloxysilane and said condensation catalyst is selected from tetraoctadecylorthotitanate, dibutyltindioleate, dibutyltindilaurate, tetraisopropyl titanate, or tetraethylorthotitanate.

13. The method according to claim 11, wherein said pressure is between about 300 psig and 600 psig.

14. The method according to claim 1, wherein said dielectric property-enhancing fluid is a mixture of:
(a) at least one anti-treeing agent; and
(b) a water-reactive compound having a diffusion coefficient of greater than $10^{-7}$ cm$^2$/second at 50° C. in said polymeric insulation Qcket, said mixture having an initial viscosity of $\leqq 100$ cP at 25° C., wherein said components (A) and (B) are different.

15. The method according to claim 14, wherein said anti-treeing agent is at least one compound selected from phenylmethyldimethoxysilane, phenyltrimethoxysilane, diphenyldimethoxysilane or phenylmethyldiethoxysilane, and said water-reactive compound is selected from trimethylmethoxysilane or dimethyldimethoxysilane.

16. The method according to claim 1, wherein each said existing connector is replaced using vacuum excavation equipment available at the site of said cable section to uncover each said existing connector in preparation for replacement.

17. The method according to claim 16, wherein each said existing connector is replaced using equipment selected from supersonic air cutting equipment or water jet cutting equipment available at the site of said cable section.

18. A method for extending the useful life of at least one in-service electrical cable section having at least two existing connectors attached thereto, said cable section having a stranded conductor surrounded by a conductor shield encased in a polymeric insulation jacket and having an interstitial void volume in the region of the conductor, said method comprising:
(a) de-energizing said cable section;
(b) after said cable section is de-energized, replacing each said existing connector with a corresponding high-pressure connector;
(c) connecting a source of dielectric enhancement fluid to at least one of said high-pressure connectors;
(d) injecting the dielectric enhancement fluid into the interstitial void volume of said cable section through said at least one high-pressure connector and confining said fluid therein at a pressure sufficient to introduce at least about 0.75 Q of said fluid, wherein Q represents the weight of said fluid which would saturate said conductor shield and said insulation jacket, the interstitial void volume of said cable section at atmospheric pressure being less than that which would accommodate said amount 0.75 Q;
(e) upon completion of the injection of said fluid and prior to re-energizing said cable section, disconnecting said source of dielectric enhancement fluid from said at least one high-pressure connector; and
(f) after disconnecting said source of dielectric enhancement fluid from said at least one high-pressure connector, re-energizing said cable section, whereby said method is accomplished without use of a fluid reservoir containing said dielectric enhancement fluid to provide a soak period for said injected fluid while said cable section is energized.

19. The method according to claim 18, wherein the disconnecting step (e) occurs immediately upon completion of the injecting step (d).

20. A method for extending the useful life of at least one in-service electrical cable section having at least two existing connectors attached thereto, said cable section having a stranded conductor surrounded by a conductor shield encased in a polymeric insulation jacket and having an interstitial void volume in the region of the conductor, said method comprising:
(a) replacing each said existing connector with a corresponding high-pressure connector;
(b) connecting a source of dielectric enhancement fluid to at least one of said high-pressure connectors;
(c) injecting the dielectric enhancement fluid into the interstitial void volume of said cable section through said at least one high-pressure connector and confining said fluid therein at a pressure P sufficient to introduce at least about 0.75 Q of said fluid, wherein Q represents the weight of said fluid which would saturate said conductor shield and said insulation jacket, the interstitial void volume of said cable section at atmospheric pressure being less than that which would accommodate said amount 0.75 Q; and
(d) with said fluid confined therein at said pressure P, disconnecting said source of dielectric enhancement fluid from said at least one high-pressure connector, wherein steps (a) through (d) are carried out during a single switching cycle.

21. The method according to claim 20, wherein said method is carried out in a single visit to said cable section.

22. The method according to claim 20, wherein said pressure P is between about 300 psig and about 600 psig.

23. The method according to claim 20, wherein said dielectric enhancement fluid comprises at least one aromatic organoalkoxysilane and a condensation catalyst.

24. A method for extending the useful life of at least one in-service electrical cable segment having two terminal connectors attached thereto and at least one splice connector disposed between said terminal connectors, said cable segment having a stranded conductor surrounded by a conductor shield encased in a polymeric insulation jacket and having an interstitial void volume in the region of the conductor, said method comprising:
  (a) replacing all said terminal and splice connectors associated with said segment with corresponding high-pressure terminal and splice connectors, respectively; and
  (b) injecting a dielectric enhancement fluid into the interstitial void volume of said cable segment and confining said fluid therein at a pressure sufficient to introduce at least about 0.75 Q of said fluid, wherein Q represents the weight of said fluid which would saturate said conductor shield and said insulation, the interstitial void volume of said cable segment at atmospheric pressure is less than that which would accommodate said amount 0.75 Q, and wherein said method is carried out using only a single switching cycle.

25. The method according to claim 24, wherein said method is carried out in a single visit to said cable section.

26. The method according to claim 24, wherein said pressure is between about 300 psig and about 600 psig.

27. The method according to claim 24, wherein said dielectric enhancement fluid comprises at least one aromatic organoalkoxysilane and a condensation catalyst.

28. A method for extending the useful life of at least one in-service electrical cable segment which is in a loop configuration having a normally open point, said cable segment having two existing terminal connectors attached thereto and at least one existing splice connector disposed between said terminal connectors, said cable segment further having a stranded conductor surrounded by a conductor shield encased in a polymeric insulation jacket and having an interstitial void volume in the region of the conductor, said method comprising:
  (A) closing the normally open point and then de-energizing and grounding said cable segment;
  (B) determining precise location and distance of all splices;
  (C) performing a cost-benefit analysis and proceeding to step (D) if the incremental benefit of repair is greater than the incremental cost to repair;
  (D) digging pit(s) with a site-available vacuum excavator;
  (E) replacing each said existing terminal and splice connector with a corresponding high-pressure injection terminal and splice connector, respectively;
  (F) injecting a dielectric enhancement fluid into the interstitial void volume of said cable segment and confining said fluid therein at a pressure sufficient to introduce at least about 0.75 Q of said fluid, wherein Q represents the weight of said fluid which would saturate said conductor shield and said insulation, the interstitial void volume of said cable segment at atmospheric pressure is less than that which would accommodate said amount 0.75 Q; and
  (G) insulating all splices and terminations, re-filling the pit(s), re-energizing the cable, and, opening the normally open point, said method being carried out using only a single switching cycle.

29. The method according to claim 28, wherein said method is carried out in a single visit to said cable segment.

30. The method according to claim 28, wherein said pressure is between about 300 psig and about 600 psig.

31. The method according to claim 28, wherein said dielectric enhancement fluid comprises at least one aromatic organoalkoxysilane and a condensation catalyst.

32. A method for extending the useful life of at least one in-service electrical cable section having at least two existing connectors attached thereto, said cable section having a stranded conductor surrounded by a conductor shield encased in a polymeric insulation jacket and having an interstitial void volume in the region of the conductor, said method comprising:
  (a) replacing each said existing connector with a corresponding high-pressure connector such that the cable section has a first closable high-pressure connector attached at one terminus thereof and a second closable high-pressure connector attached at another terminus thereof, each of said first and second high-pressure connectors providing fluid communication to said interstitial void volume;
  (b) opening both said first and second high-pressure connectors and introducing at least one dielectric property-enhancing fluid via said first high-pressure connector so as to fill said interstitial void volume;
  (c) closing said second high-pressure connector and introducing an additional quantity of said dielectric property-enhancing fluid via said first connector at a pressure sufficient to introduce at least about 0.75 Q of said fluid, wherein Q represents the weight of said fluid which would saturate said conductor shield and said insulation jacket, the interstitial void volume of said cable section at atmospheric pressure being less than that which would accommodate said amount 0.75 Q; and
  (d) closing said first high-pressure connector so as to contain said dielectric property-enhancing fluid within said interstitial void volume at said pressure, said method being carried out using only a single switching cycle.

33. A method for extending the useful life of at least one in-service electrical cable section having at least two existing connectors attached thereto, said cable section having a stranded conductor surrounded by a conductor shield encased in a polymeric insulation jacket and having an interstitial void volume in the region of the conductor, said method comprising:
  (a) removing said existing connectors;
  (b) attaching a first closable high-pressure connector to a first terminus of said section;
  (c) attaching a second closable high-pressure connector to a second terminus of said section, each of said first and second connectors providing fluid communication to said interstitial void volume;
  (d) opening both of said first and second high-pressure connectors and introducing at least one dielectric property-enhancing fluid via said first high-pressure connector so as to fill said interstitial void volume;
  (e) closing said second high-pressure connector and introducing an additional quantity of said dielectric property-enhancing fluid via said first high-pressure connector at a pressure sufficient to introduce at least about 0.75 Q of said fluid, wherein Q represents the weight of said fluid which would saturate said conductor shield and said insulation jacket, the interstitial void volume of said cable section at atmospheric pressure being less than that which would accommodate said amount 0.75 Q; and (f) closing said first high-pressure connector so as to contain said dielectric property-enhancing fluid within said void volume at said pressure, said method being carried out using only a single switching cycle.

34. The method according to claim 33, wherein said method is carried out in a single visit to said cable section.

35. The method according to claim 33, wherein said pressure is between about 300 psig and about 600 psig.

36. The method according to claim 33, wherein said dielectric enhancement fluid comprises at least one aromatic organoalkoxysilane and a condensation catalyst.

* * * * *

UNITED STATES PATENT AND TRADEMARK OFFICE
CERTIFICATE OF CORRECTION

PATENT NO. : 7,353,601 B1
APPLICATION NO. : 11/379979
DATED : April 8, 2008
INVENTOR(S) : Glen J. Bertini It is certified that error appears in the above-identified patent and that said Letters Patent is hereby corrected as shown below:

Col. 11, line 64 should read:
130. The plug pin 140 has a diameter slightly larger than Col. 15, line 9 should read:
insulation jacket in Table 2 below for a hypothetical three Col. 15, line 16 should read:
the conducator shield in this example).  Q is the sum of the Col. 18, line 31 should read:
tion is complete, as described in greater detail in United Col. 19, line 40 should read:
aromatic organoalkoxysilane is tolylethymethyldimethyloxysilane Signed and Sealed this Twenty-seventh Day of January, 2009

JOHN DOLL
*Acting Director of the United States Patent and Trademark Office*